United States Patent [19]

Shackle

[11] Patent Number: 5,412,287
[45] Date of Patent: May 2, 1995

[54] CIRCUIT FOR POWERING A GAS DISCHARGE LAMP

[75] Inventor: Peter W. Shackle, Arlington Heights, Ill.

[73] Assignee: Motorola Lighting, Inc., Buffalo Grove, Ill.

[21] Appl. No.: 164,245

[22] Filed: Dec. 9, 1993

[51] Int. Cl.⁶ .............................................. H05B 41/16
[52] U.S. Cl. .................................. 315/247; 315/209 R; 315/278; 315/219; 315/DIG. 5
[58] Field of Search ................... 315/209 R, 247, 248, 315/219, 291, 222, DIG. 7, 246, 276, 278, 307, DIG. 5

[56] References Cited

U.S. PATENT DOCUMENTS

| | | | |
|---|---|---|---|
| 4,017,785 | 4/1977 | Perper | 321/4 |
| 4,277,726 | 7/1981 | Burke | 315/DIG. 7 X |
| 4,808,887 | 2/1989 | Fuhnrich et al. | 315/247 |
| 5,003,231 | 3/1991 | Perper | 315/291 |
| 5,010,277 | 4/1991 | Courier de Mere | 315/200 |
| 5,041,766 | 8/1991 | Fiene et al. | 315/219 |
| 5,173,643 | 12/1992 | Sullivan et al. | 315/219 X |
| 5,175,474 | 12/1992 | Kakitani et al. | 315/219 X |

FOREIGN PATENT DOCUMENTS 2115627  2/1982  United Kingdom .

Primary Examiner—Robert J. Pascal
Assistant Examiner—Haissa Philogene
Attorney, Agent, or Firm—J. Ray Wood

[57] ABSTRACT

A parallel resonant circuit for powering a gas discharge lamp achieves power factor correction by using a floating power supply having adjustable voltage and impedance level. The floating power supply is powered by a transformer and placed in series with the rectified AC power line.

14 Claims, 4 Drawing Sheets

CIRCUIT FOR POWERING A GAS DISCHARGE LAMP

BACKGROUND OF THE INVENTION

Gas discharge lamps can be operated most efficiently by AC (alternating current) power at a relatively high frequency (on the order of 35 KHz (kilohertz). However, line AC power is supplied by utility companies at low frequencies of around 50 or 60 Hz (hertz). To obtain high efficiency operation of the lamps, the AC power at the first low frequency is converted to AC power at a second high frequency.

The conversion of the AC power from one frequency to another is accomplished by a ballast circuit. The AC power at the first low frequency is rectified into DC (direct current) power, and then stored as energy in a relatively large electrolytic capacitor. The energy stored in the electrolytic capacitor is then chopped by an inverter into AC power at a second high frequency.

In this kind of circuit, whenever the voltage of the line AC power is greater than the voltage stored in the electrolytic capacitor, a relatively large surge of current passes into the electrolytic capacitor, causing the line current drawn to be "peaky". This circuit thus has a poor power factor.

One solution is to place a floating voltage supply in series with the incoming line to the capacitor. Such a supply presents several problems. First, the voltage on the supply must be controlled so as to match the voltage on the electrolytic capacitor, otherwise the waveform of the power drawn from the line will be distorted. Second, the impedance of the supply must be adjustable so as to control the amount of power drawn from the power line. If not, the inverter will either produce too much power or there will be little correction of the power factor. Finally, the source of the power for the floating voltage supply must be stable and have low impedance.

A circuit which provides a floating voltage supply in series with the incoming line and has an adjustable impedance and an adjustable voltage level is thus desirable.

DESCRIPTION OF THE PREFERRED EMBODIMENT

A circuit which has a floating power supply and an adjustable voltage and impedance level is described below. The floating power supply is provided by a high frequency rectifier driven through a capacitor by windings on a transformer. The voltage may be adjusted by varying the number of windings on the transformer. The impedance may be adjusted by changing the size of the capacitor. Such a circuit can be used to cause an electronic ballast to display a high power factor to the AC power line with a minimal number of components.

Figure 1:
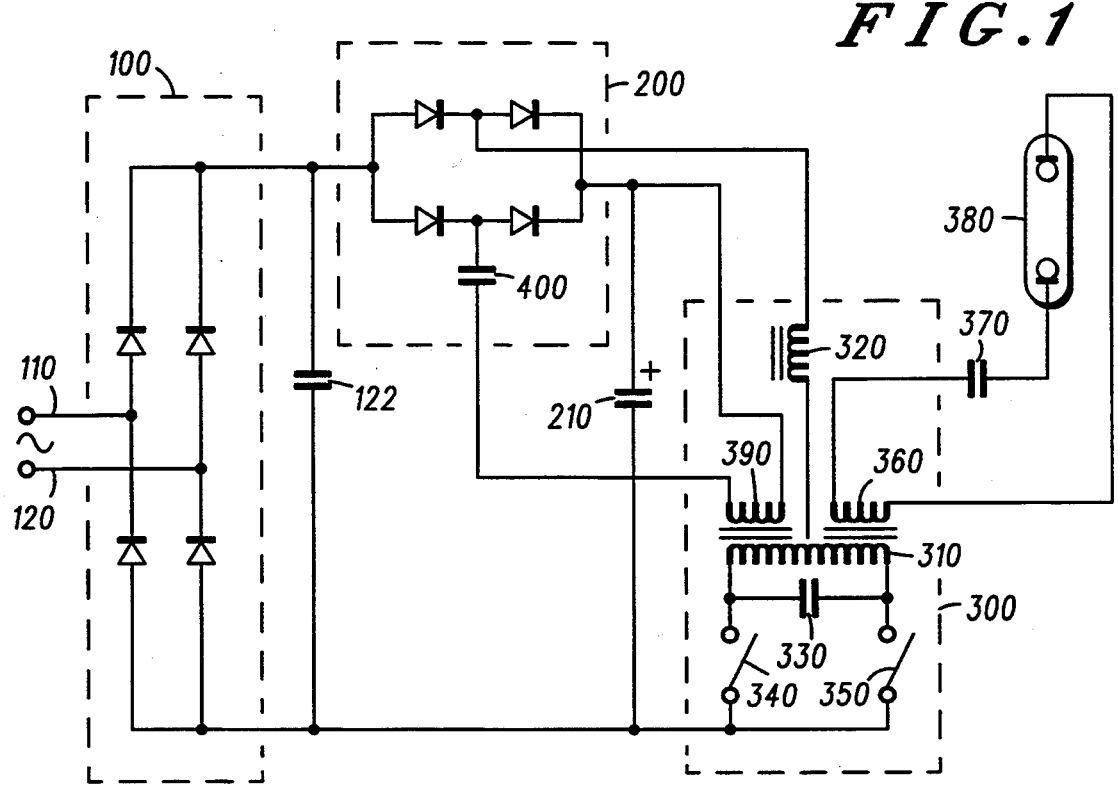
FIG. 1 shows a push pull parallel resonant circuit for energizing gas discharge lamps in which the power factor correction signal is derived from an isolated winding on the output transformer.

FIG. 1 shows a push pull parallel resonant circuit for energizing gas discharge lamps in which the power factor correction signal is derived from an isolated winding on the output transformer. Terminals 110, 120 of line rectifier 100 are coupled to a source of AC power at a relatively low frequency such as 60 cycles per second. Rectifier 100 may be a bridge rectifier. Line rectifier 100 converts the AC voltage to pulsating rectified DC voltage. Capacitor 122 prevents high frequency signals from the operation of the circuit from escaping out onto the power line. It is common practice to use some inductive components (not shown) to enhance this effect. One output terminal of the line rectifier 100 is connected to the input of a high frequency rectifier 200. (The positive terminal is shown used here, but with suitable orientation of the components either terminal may be used.)

High frequency rectifier 200 is suitable for operation at relatively high frequencies such as 35 KHz. The positive output terminal of line rectifier 100 is coupled to the negative DC output terminal of high frequency rectifier 200. The positive DC output terminal of high frequency rectifier 200 is coupled to the negative input terminal of line rectifier 100 by storage capacitor 210.

Storage capacitor 210 provides a stable reservoir of charge at relatively constant voltage for running the inverter 300. Inverter 300 is comprised of an output transformer 310, and a driver circuit including current feed inductor 320, switches 340 and 350 and resonant capacitor 330.

The driver circuit serves to apply the relatively constant current from the current feed inductor 320 to the primary of transformer 310 in alternate directions as the switches 340 and 350 are alternately switched on and off at the resonant frequency of capacitor 330 and the primary inductance of transformer 310. Capacitor 330 and the output transformer primary inductance constitute a resonant tank in which charge constantly circulates back and forth at the resonant frequency. If the amplitude of the oscillation becomes too large, then the voltage at the center tap of transformer 310 becomes high enough to decrease the current through feed inductor 320, thus decreasing the drive and ensuring a constant amplitude for the oscillation. Switches 340 and 350 are usually driven by auxiliary windings on the output transformer (not shown).

A feedback circuit is provided from the output transformer to the high frequency rectifier 200, via power factor correction winding 390 and capacitor 400 to high frequency rectifier 200.

High frequency rectifier 200 is thus energized through capacitor 400 by the relatively constant voltage high frequency signal derived from power factor correction winding 390. By adjusting the number of turns in power factor correction winding 390, there is a means for controlling the level of the DC voltage across the output terminals of high frequency rectifier 200. Matching the open circuit level of the voltage across the output terminals of high frequency rectifier 200 to the voltage level across the DC storage capacitor 210 significantly improves the power factor of the circuit. When the input voltage at terminals 110, 120 is non zero, the current drawn from the AC line is limited only by the output impedance of high frequency rectifier 200. It may be shown by mathematical analysis that at frequencies comparable to 60 Hz this impedance is a resistance, of magnitude inversely proportional to the value of capacitor 400. Therefore, the operating power level of the inverter is controlled by the value of capacitor 400. A large capacitor gives a high power level and vice versa. Since only the resistive impedance of high frequency rectifier 200 limits the incoming line current, then when the voltage provided at the output of high frequency rectifier 200 matches the voltage across storage capacitor 210, the current drawn from the power line will be purely sinusoidal as corresponds to a resistive impedance.

Load winding 360 couples the output power to the lamps 380 via current limiting capacitor 370. Normally additional circuitry is provided, (not shown) to sense when an overvoltage condition exists due, for example, to a lamp being removed. In this circumstance it is desirable either to shut down the boosting action or to shut down the entire inverter.

For this circuit to present a high power factor to the AC power line, a constant high frequency voltage may be applied to the high frequency rectifier 200 through capacitor 400. For parallel resonant circuits there are several convenient ways to produce this voltage.

Figure 2:
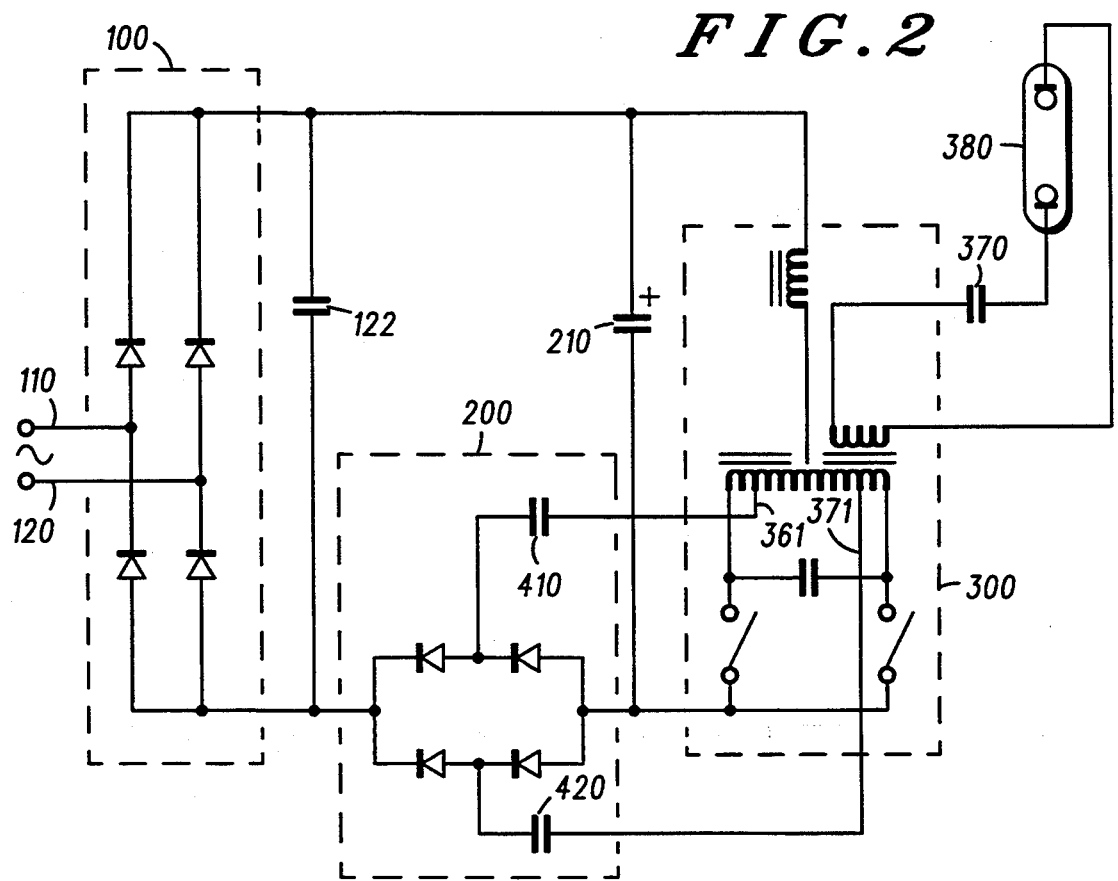
FIG. 2 shows a push pull parallel resonant circuit for energizing gas discharge lamps in which the power factor correction signal is derived from an autotransformer tapping on the primary winding of the output transformer.

For example, FIG. 2 shows a parallel resonant push pull ballast circuit in which the power factor correction signal is derived from autotransformer tappings 361 and 371 on the primary of the output transformer. The exact number of turns from the center to each tapping point determines the voltage being applied to the high frequency rectifier 200. In this case the values of the capacitors 410 and 420 determine the power level of the system. With this autotransformer as in all autotransformers, the output voltage may be either greater than or less than the input voltage.

Figure 3:
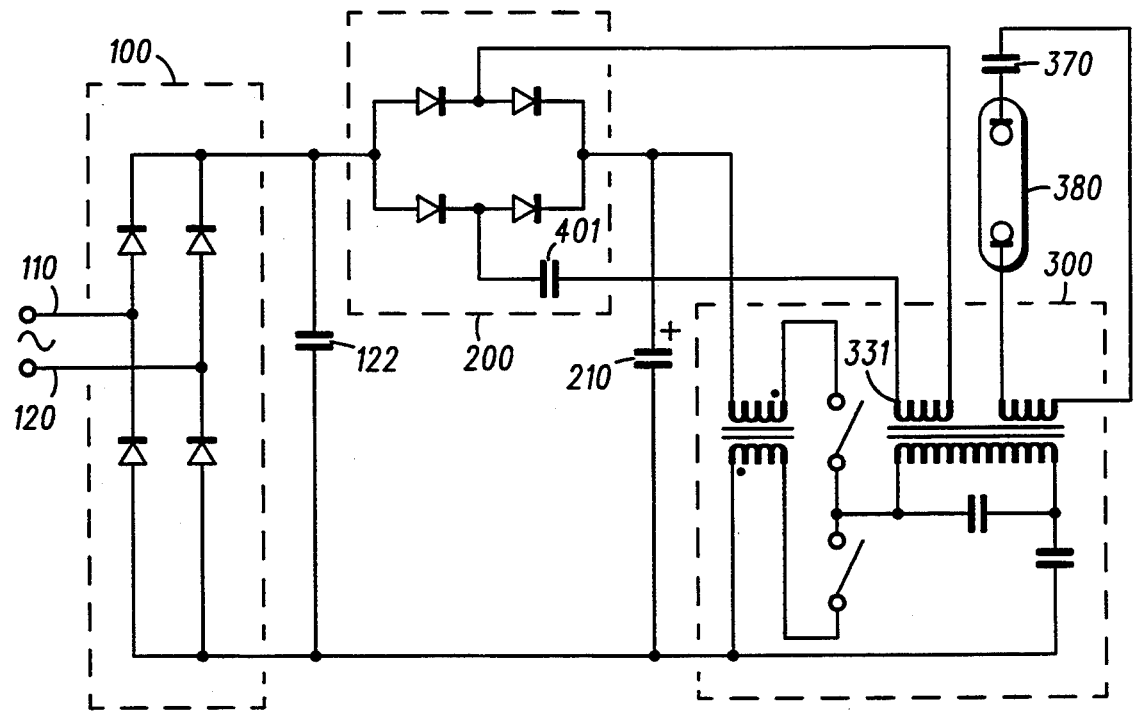
FIG. 3 shows a current fed half bridge driven parallel resonant circuit for energizing gas discharge lamps in which the power factor correction signal is derived from an isolated winding on the output transformer.

FIG. 3 shows an arrangement for a current fed half bridge driven parallel resonant ballast in which the power factor correction signal is derived from a winding 331 on the output transformer, and the output power level is set by the value of capacitor 401.

Figure 4:
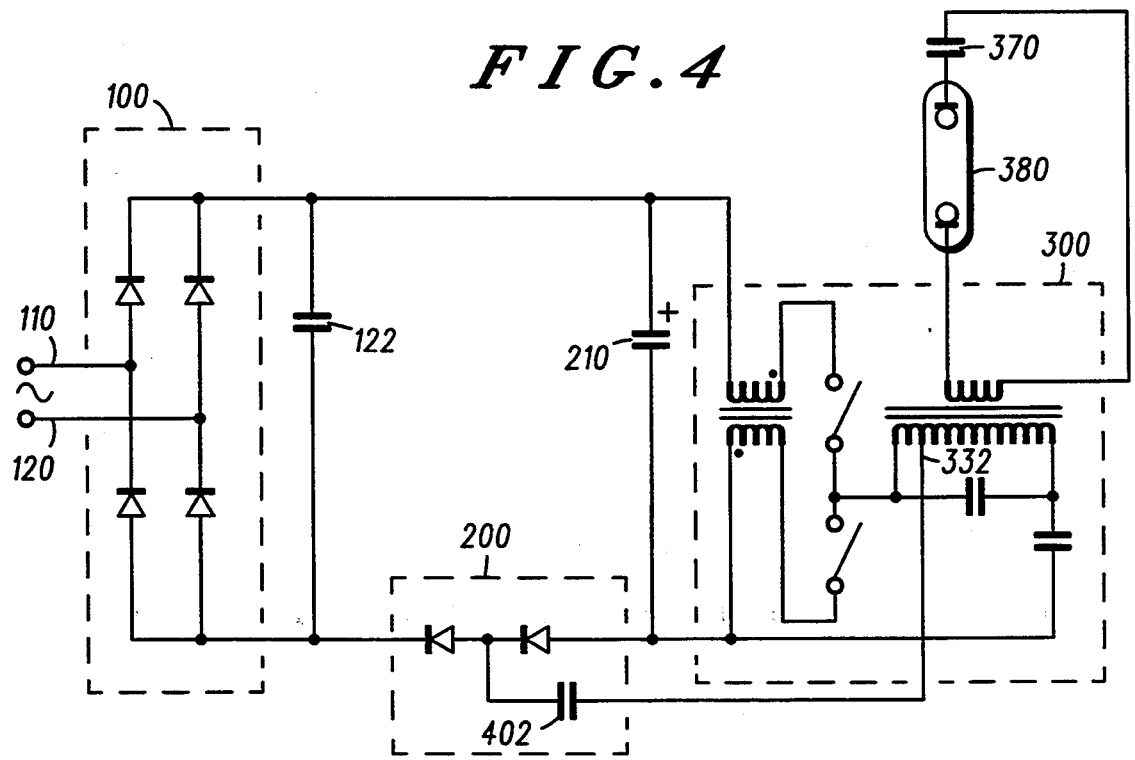
FIG. 4 shows a current fed half bridge driven parallel resonant circuit for energizing gas discharge lamps in which the power factor correction signal is derived from an autotransformer tapping on the primary of the output transformer.

FIG. 4 shows another current fed half bridge driven parallel resonant ballast in which the power factor correction signal is derived from an autotransformer tapping 332 on the primary winding of the output transformer. Power is controlled by capacitor 402.

Figure 5:
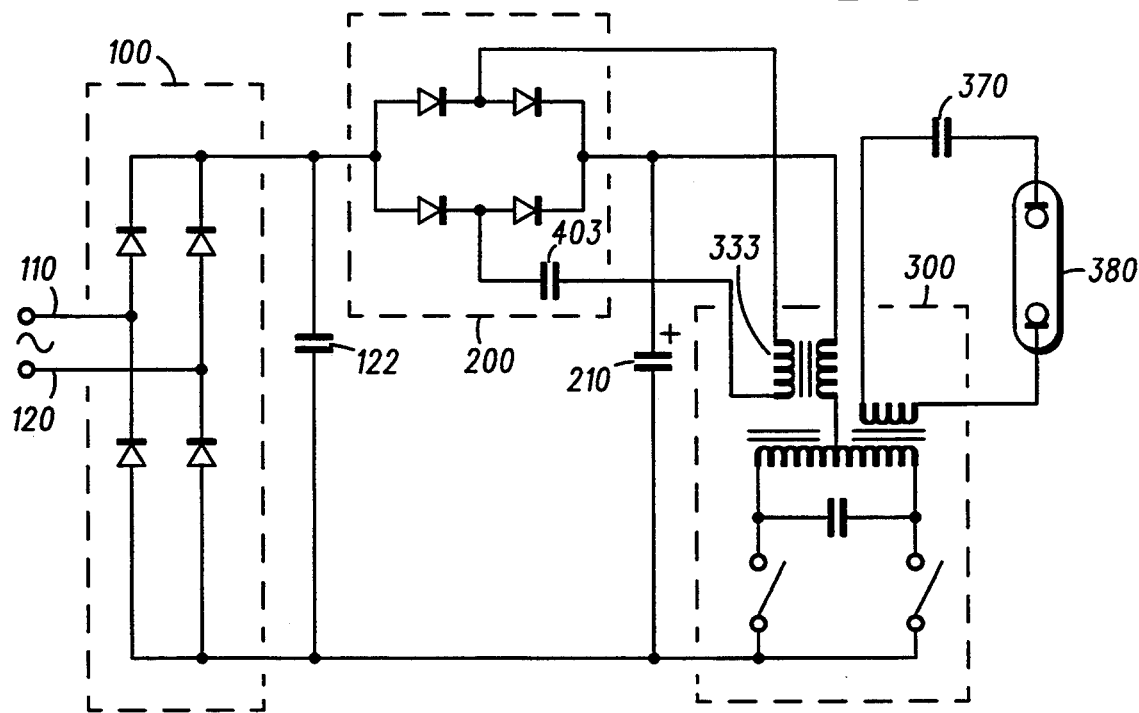
FIG. 5 shows a push pull parallel resonant circuit for energizing gas discharge lamps in which the power factor correction signal is derived from an isolated winding on the current feed inductor.
Figure 6:
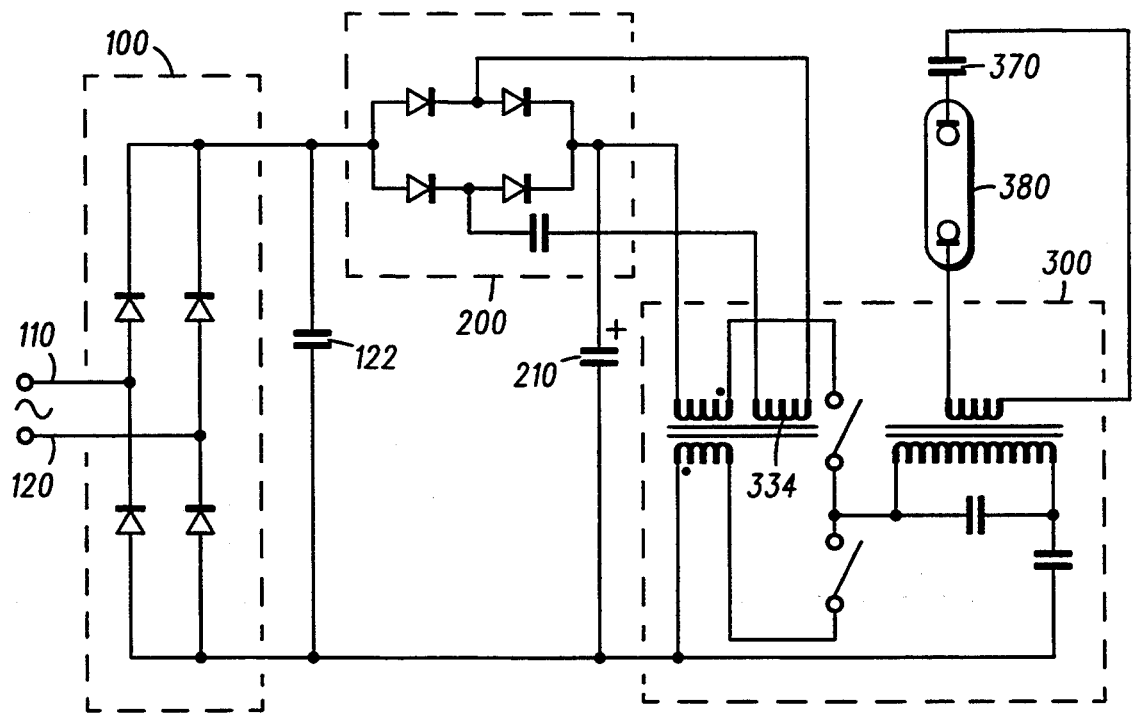
FIG. 6 shows a current fed half bridge driven parallel resonant circuit for energizing gas discharge lamps in which the power factor correction signal is derived from an isolated winding on the current feed transformer.

Sufficiently constant high frequency signals to use for power factor correction may also be derived from the current feed inductor of a current fed inverter. For example, FIG. 5 shows a parallel resonant push pull ballast in which an auxiliary winding on the current feed inductor 333 is used to provide the power factor correction signal, through power limiting capacitor 403. This same technique will also work for a current fed half bridge driven parallel resonant ballast, as shown in FIG. 6. Here the power factor correction signal is provided by an auxiliary winding 334 on the current feed transformer.

Figure 7:
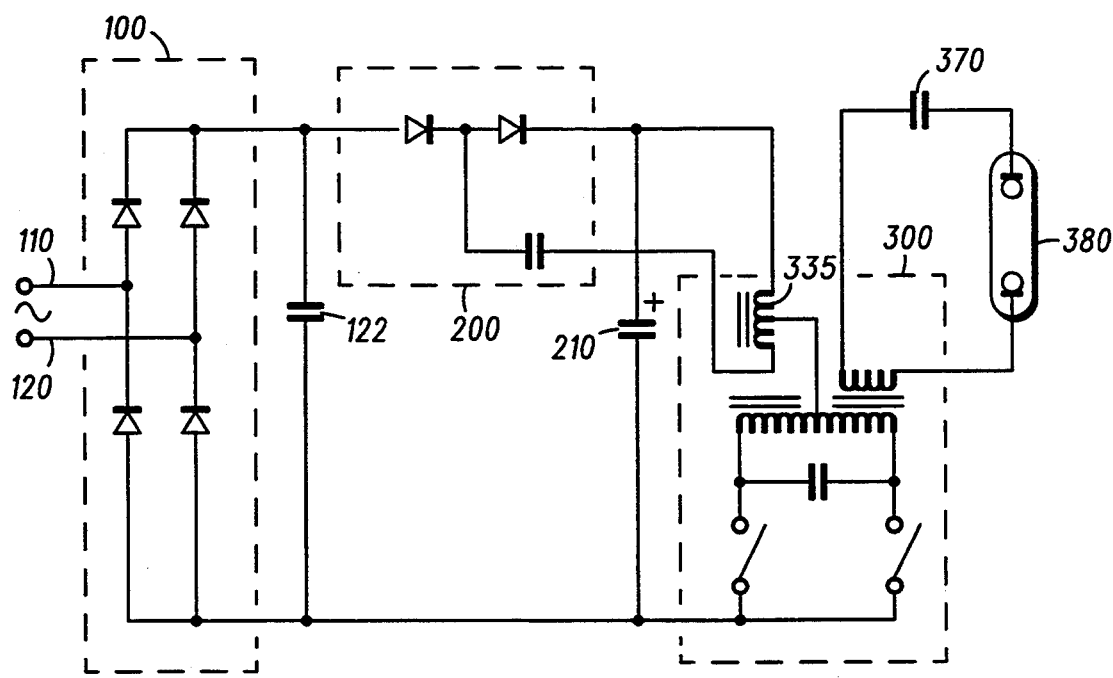
FIG. 7 shows a push pull parallel resonant circuit for energizing gas discharge lamps in which the power factor correction signal is derived from an autotransformer tapping on the current feed inductor.
Figure 8:
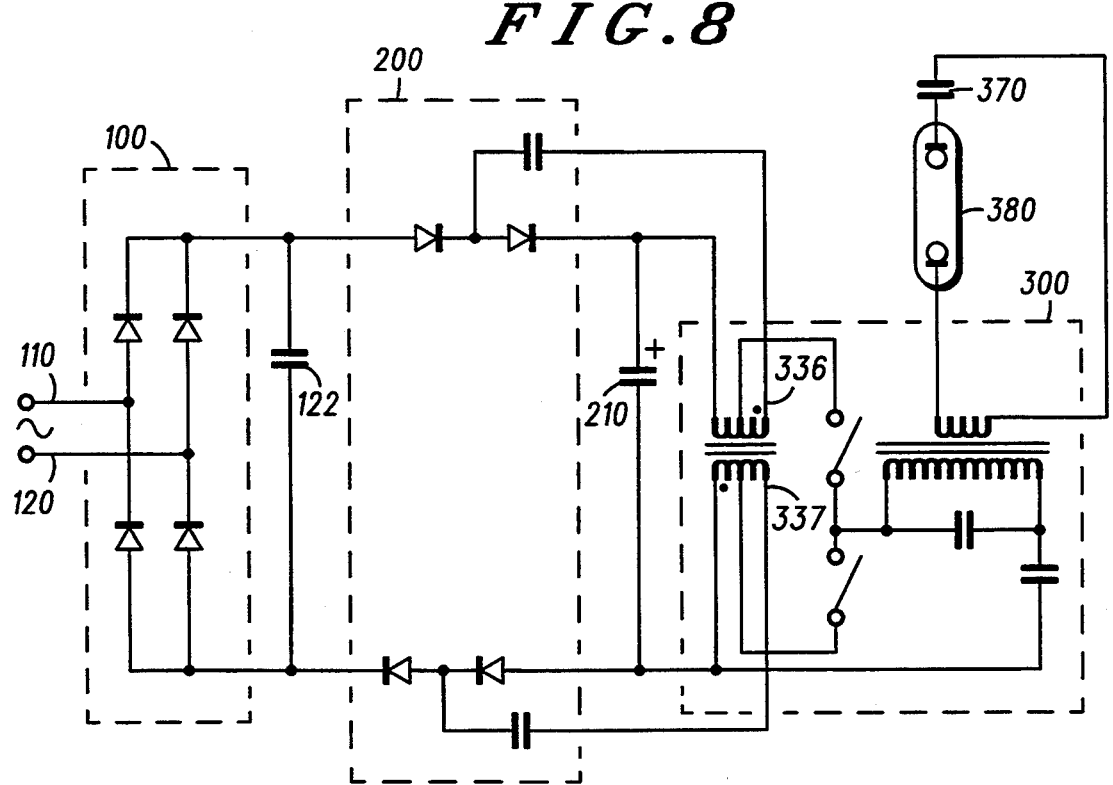
FIG. 8 shows a current fed half bridge driven parallel resonant circuit for energizing gas discharge lamps in which the power factor correction signal is derived from autotransformer tappings on the current feed inductor windings.

When the power factor correction signal is derived from a current feed inductor, autotransformer techniques may also be used to adjust the voltage, with direct coupling. This is shown for the case of a parallel resonant push pull ballast in FIG. 7, where the power factor correction signal is derived from an autotransformer extension 335 on the current feed inductor. This same principle may also be applied to a current fed half bridge driven parallel resonant circuit with a split current feed inductor, as shown in FIG. 8. Since the current feed is split here, then two auto transformer extensions 336, 337 are possible and two corresponding high frequency rectifiers are used. This arrangement can also be made to work with only one autotransformer extension and one high speed rectifier. However, in order to spread the power loading as evenly as possible over the windings of the current feed transformer, the twin tapping arrangement may be preferred.

I claim:

1. A circuit for powering a gas discharge lamp from a source of a first frequency AC power comprising:
a first rectifier for converting the first frequency AC power into a first DC power; a capacitor coupled to the rectifier for storing the DC power as energy; an inverter comprising a driver and a transformer; the driver having a driver input and a plurality of driver outputs, the driver input coupled to the capacitor for converting the energy stored in the capacitor into a second frequency AC power; the transformer having a transformer input and one or more transformer outputs, and having a resonant capacitor connected in parallel with the input, the transformer input and the resonant capacitor forming a parallel resonant tank circuit, the parallel resonant tank circuit coupled to the lamp for powering the lamp; a power factor correction signal source for producing a power factor correction signal; a second rectifier having a second rectifier input and a second rectifier output, the second rectifier including a capacitor coupled in series between the rectifier and the power factor correction signal source for limiting the output current of the rectifier, the second rectifier input coupled to the power factor correction signal source for receiving the power factor correction signal, the second rectifier output providing a second DC power; and the second DC power being used for the purpose of correcting the input power factor of the circuit.

2. The circuit of claim 1 where the power factor correction signal source is an output from the driver circuit.

3. The circuit of claim 2 where the driver circuit has a current feed inductor.

4. The circuit of claim 3 where the power factor correction signal source is an autotransformer connection to the current feed inductor.

5. The circuit of claim 4 where the power factor correction signal source is an auxiliary winding on a current feed inductor.

6. The circuit of claim 1 where the power factor correction signal source is an output from the transformer.

7. The circuit of claim 6 where the output from the transformer is an autotransformer connection to the input of the transformer.

8. The circuit of claim 6 where the output from the transformer is an isolated winding.

9. The circuit of claim 2 where the inverter is a push-pull inverter.

10. The circuit of claim 2 where the inverter is a half-bridge inverter.

11. The circuit of claim 5 where the inverter is a push-pull inverter.

12. The circuit of claim 5 where the inverter is a half-bridge inverter.

13. The circuit of claim 6 where the inverter is a push-pull inverter.

14. The circuit of claim 6 where the inverter is a half-bridge inverter.

* * * * *